(No Model.)
G. W. HERTZEL.
GARDEN RAKE.
No. 359,255. Patented Mar. 15, 1887.
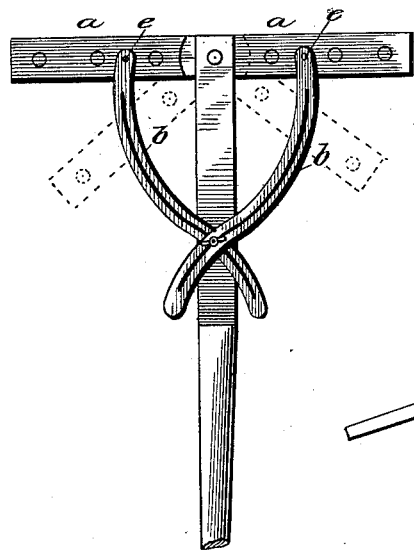
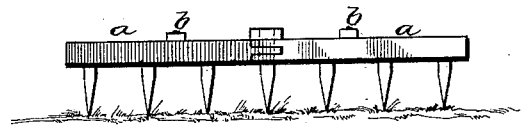
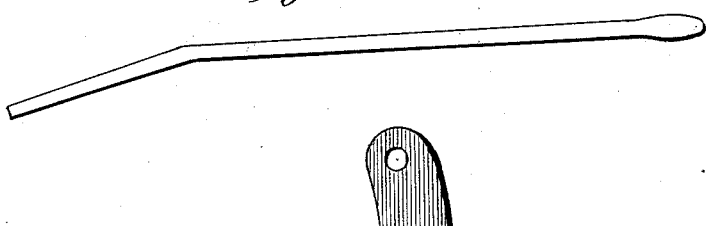
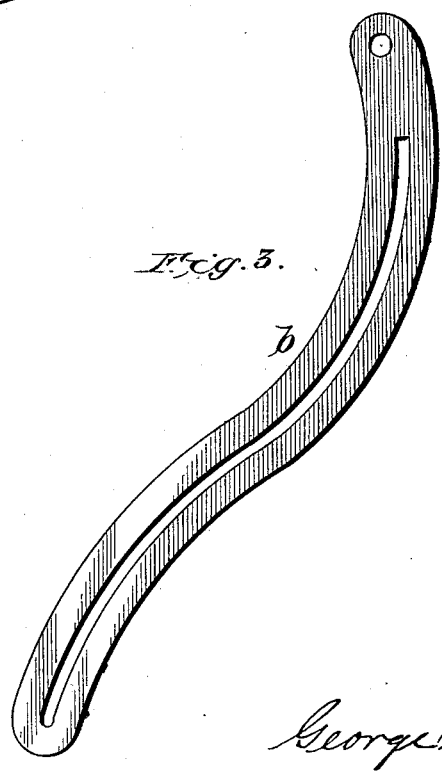
Witnesses
Jos. A. Ryan
F. R. Cunningham
George W. Hertzel
Inventor
By Asso, Attorney
D. B. Gallatin

UNITED STATES PATENT OFFICE.

GEORGE WASHINGTON HERTZEL, OF WARREN, PENNSYLVANIA.

GARDEN-RAKE.

SPECIFICATION forming part of Letters Patent No. 359,255, dated March 15, 1887.

Application filed July 8, 1885. Serial No. 170,989. (No model.)

*To all whom it may concern:*

Be it known that I, GEORGE WASHINGTON HERTZEL, of Warren, in the county of Warren and State of Pennsylvania, have invented a new and useful Improvement in Garden-Rakes; and I do hereby declare that the following is a full, clear, and exact description of the same, reference being had to the accompanying drawings, forming part of this specification.

My invention consists in a novel construction of a rake having its head made in two sections hinged or pivoted at their inner ends to the end of the rake-handle and connected with said handle by means of curved slotted bars, and a thumb-screw, whereby provision is made for holding said sections in a right line with each other and for adjusting and holding them at different angles nearer to or farther from the handle, as hereinafter more particularly described.

In the accompanying drawings, Figure 1 is a top view of the rake with the sections of the head shown in full lines as extended in line with each other and in dotted lines as adjusted at an angle nearer to the handle. Fig. 2 is a front elevation of the rake-head. Fig. 3 is a detail view of one of the curved bars. Fig. 4 is a view of the handle.

The rake-head is made in two sections, *a a*, the inner ends of which are joined to each other and to the end of the handle by means of the middle tooth, *d*, which serves the threefold purposes of a rivet, a pivot, and a tooth. To each section *a* is pivoted, at *e*, one end of a curved slotted bar, *b*, the opposite ends of said bars being lapped one over the other, with a thumb-screw, *c*, passing through the slots and into the shank of the handle. By this means the rake-head may be held in an extended position, as shown in full lines, or at any intermediate position nearer to the handle, as shown in dotted lines.

I am aware that it is not broadly new to pivot a rake-head to its handle, nor to make the head in two parts to fold back toward the handle, and I therefore do not claim such constructions, broadly; but

What I claim as new, and desire to secure by Letters Patent, is—

A garden-rake having its head made in two parts or sections hinged together and to a handle, each section having pivoted to it a slotted brace, *b*, adapted to be clamped to the handle by a set-screw passing through both slots, whereby the sections of the head may be adjusted and set at different angles, substantially as shown and described.

GEORGE WASHINGTON HERTZEL.

Witnesses:
W. W. RANKIN,
W. H. ALLEN.